United States Patent Office 3,017,401
Patented Jan. 16, 1962

3,017,401
ETHYLENE POLYMERIZATION WITH ALUMINUM TITANIUM TETRACHLORIDE CATALYSTS
Gilbert Bo, Edouard Fichet, and André Perrot, Lyon, and Philippe Perras, Collonge au Mont d'Or, France, assignors to Societe des Usines Chimiques Rhone-Poulenc, Paris, France, a corporation of France
No Drawing. Filed Mar. 19, 1958, Ser. No. 722,396
Claims priority, application France Mar. 23, 1957
2 Claims. (Cl. 260—94.9)

The present invention concerns an improvement in the preparation of catalysts for the polymerisation of ethylene into solid products of high molecular weight.

It has already been proposed to employ as catalysts in the polymerisation of ethylene the products obtained by the reaction of aluminium with titanium tetrachloride under heat, either in the absence or in the presence of inert diluents, such as saturated aliphatic and cycloaliphatic hydrocarbons, unsaturated cycloaliphatic hydrocarbons, or aromatic hydrocarbons.

In this reaction, the aluminium reacts with the liquid titanium tetrachloride to give solid titanium chlorides of lower degrees of oxidation, and aluminium chlorides. These solid chlorides are ill-defined complex mixtures. However, they can be distinguished by their appearance. Depending upon the intensity of the reaction and the operating conditions, the mixtures obtained have either a grey coloration, when analysis shows that they still contain unconverted titanium tetrachloride, or a violet-pink tint, in which case they generally contain no titanium tetrachloride, or finally a brown or even a quite black tint. Now, while these mixtures all possess the ability to polymerise ethylene into solid products, they have very variable productivity (that is to say, weight of polyethylene produced per unit weight of catalyst before the activity of the catalyst falls to an undesirably low value) and give polymers whose mechanical properties are also variable. It has been observed that the catalysts giving the best results from the viewpoint of quality and homogeneity of the polyethylenes, while having good productivity, are the mixtures of violet-pink colour.

Now, if a single diluent consisting of a saturated aliphatic, saturated cycloaliphatic or aromatic hydrocarbon in the pure state is employed in the preparation of the catalyst, it is observed that it is difficult to obtain regularly violet-pink catalysts, which raises the problem of reproducibility of the catalyst, in particular on an industrial scale.

In the case of cyclohexane, for example, the quantity of titanium tetrachloride reacting with the aluminium, even in excess, is very variable, even under the same temperature and pressure conditions. The colour of the catalysts obtained varies from grey to pink. The content of unconverted titanium tetrachloride may remain considerable. In some cases, more than 90% of the titanium tetrachloride employed is found unchanged in the cyclohexane. The grey catalysts have good productivity of polyethylene, but the polymers obtained have relatively low specific viscosity and give more or less brittle shaped products.

On the other hand, if the operation is carried out in pure benzene as diluent, brown or black catalysts are generally obtained. Here again, these black products are acceptable as catalysts, but they have a relatively low productivity and give polymers of low viscosity.

It has now been found, and this forms the subject of the present invention, that active catalysts are obtained with excellent reproducibility which give solid ethylene polymers of very good quality if the reaction between the titanium tetrachloride and the aluminium is carried out at an elevated temperature in the absence of ethylene and other hydrocarbons which would polymerise under the conditions employed and in the presence of a liquid diluent comprising at least one saturated aliphatic or cycloaliphatic hydrocarbon (i.e. at least one completely saturated hydrocarbon) and at least one aromatic hydrocarbon. Preferably the completely saturated hydrocarbon or hydrocarbons make up the greater part of the diluent, the aromatic component being present in a minor proportion, and especially in amount between about 0.5 and 5 or 10% by volume of the diluent.

The preparation of the catalyst is effected at temperatures which may range up to 300° C. The operation is carried out in a closed vessel under the pressure corresponding to the vapour pressure of the reaction mixture.

The temperature and the duration of the heating are a function of the quantity of aromatic hydrocarbons in the diluent. By way of example, a good catalyst is obtained by employing as reaction medium cyclohexane with an addition of 12–13 g. of benzene per litre and heating for 1 hour at 215–220° C. It is possible either to lower the temperature to a large degree for the same reaction duration, or to reduce the duration of the reaction for the same temperature, if somewhat larger benzene proportions are employed.

The respective proportions of aluminium and titanium tetrachloride may vary within wide limits. High $Al:TiCl_4$ ratios generally assist in producing very active catalysts.

The aluminium employed in the preparation of the catalyst is preferably in finely divided form, powder or flakes.

In order to facilitate the reaction, it is desirable to agitate the mixture vigorously.

The preparation of the catalyst may be effected in the same vessel as is employed for the polymerisation or in a special vessel from which the catalyst is thereafter transferred into the polymerising vessel without being allowed to come into contact with the atmosphere.

The polymerisation of the ethylene is effected either discontinuously or continuously under pressures generally lower than 50 atmospheres. Higher pressures may be employed, but no particular advantage results therefrom.

The polymerisation temperature may range from room temperature to 200° C. In practice, temperatures of 110° to 150° C. are preferably employed.

The ethylene employed may be a technical product and the absolute elimination of the standard impurities is not necessary. An addition of small quantities of oxygen or air increases the productivity of the catalyst.

The following examples, which are not intended to be limitative, illustrate a number of methods of carrying the invention into effect.

Example I

A catalyst is prepared in sealed Pyrex glass tube from:

3 g. of powdered aluminium,
3.4 g. of titanium tetrachloride,
35 cc. of cyclohexane,
0.5 cc. of benzene, and is heated for 1 hour at 220° C.

After cooling, the catalyst is in the form of a pink powder in suspension in the cyclohexane. Less than 0.2 g. of unchanged titanium tetrachloride remains in solution.

A test polymerisation of ethylene is carried out with the aid of this catalyst in an autoclave having a capacity of 3600 cc. and provided with an agitator having a rotating frame.

The contents of the tube and 1000 cc. of cyclohexane are introduced under a nitrogen atmosphere, the autoclave is closed, agitation is started and heating is effected. When the temperature reaches 90° C., ethylene is introduced until the pressure reaches 25 atm., and with it dry oxygen in amount such that the reaction mixture contains about 50 cc. of oxygen per cc. of $TiCl_4$ introduced. The polymerisation reaction is strongly exothermic, and it is necessary to cool the autoclave in order to maintain the temperature at about 145–150° C. The pressure is maintained in the neighbourhood of 30 atm. by periodic introduction of further quantities of ethylene. At the end of 2 hours 30 minutes, the operation is stopped.

The production of polymer rises to 247 g., which represents a productivity of 70 g. of polymer per gram of titanium tetrachloride employed.

The polymer recovered is purified by solution in hot cyclohexane, and then precipitated by cooling after filtration of the solution.

A completely white polymer is obtained, which has a specific viscosity equal to 1.27 (measured on a 4% solution of polymer in tetralin at 130° C.). This polymer has remarkable mechanical properties. When moulded under heat, it gives unbreakable plates.

By way of comparison, a catalyst was prepared under the same conditions from the same quantities of titanium tetrachloride and aluminium, but in benzene as diluent.

A catalyst of black colour was obtained. On analysis, no $TiCl_4$ is found. A test polymerisation of a duration of 2 hours 30 minutes, effected as above, gives only 72 g. of polymer (i.e. a productivity of 22.5 g. per g. of $TiCl_4$ of a specific viscosity of 0.680.

A plate prepared by moulding under heat has some flexibility, but finally breaks on bending.

In another test carried out in an identical manner, a brown, and not decidedly black, catalyst was obtained. This catalyst gives after 2 hours 30 minutes of polymerisation 90 g. of a polyethylene having a specific viscosity of 0.72. The productivity was 27 g. per g. of $TiCl_4$. The plates obtained by hot moulding are brittle.

*Example II*

A catalyst is prepared in the following manner:

Into a 500 cc. autoclave of stainless steel having lateral agitation are introduced in the following order and under a nitrogen atmosphere:

Powdered aluminum _____ 9 g.
Pure cyclohexane _____ 125 cc.
Benzene _____ 2 cc.
Freshly distilled titanium tetrachloride—6 cc__ (10.4 g.).

8 Stainless steel balls are added and the mixture is heated for 1 hour at 220° C. with agitation.

The catalyst takes the form of a violet-pink powder in suspension in the cyclohexane. Analysis shows that only 0.01 to 0.02 g. of $TiCl_4$ remain out of the 10.4 g. introduced.

A test polymerisation of ethylene is continuously performed with the aid of this catalyst in an autoclave equipped with an agitator of the rotating-frame type. The suspension of catalyst, previously diluted with 4 litres of cyclohexane, is continuously injected by means of a controlled-feed pump. A constant ethylene pressure of 30 atm. and a temperature of 140–145° C. are maintained in the autoclave. At the same time, such a quanity of oxygen is introduced that there are about 50 cc. of oxygen per cc. of $TiCl_4$ introduced.

At regular intervals, polymer is withdrawn and collected by a vessel in which a lower pressure obtains, permitting of degassing the ethylene dissolved in the polymer.

After about 2 hours, when all the catalyst has been injected, a second charge of catalyst prepared under the same conditions is introduced, and the injection pump is adjusted to a rate of feed of 1500 to 1600 cc. of catalyst suspension per hour.

When this second catalyst has been used, a third charge is introduced. The polymerisation was thus continued for 7 hours.

The polymer collected is purified by solution in hot cyclohexane and then precipitated by cooling after filtration of the solution.

On drying, a perfectly white polymer is obtained which has a specific viscosity of 0.950 and a specific gravity of 0.960 measured at 25° C. The productivity was 45 g. of polyethylene per gram of $TiCl_4$ employed.

The mouldings obtained under heat with the aid of these polymers are both flexible and unbreakable.

Practically no variation is observed in the productivity and in the properties of the polymers obtained in the course of the 7 hours of the operation, which shows that the three catalysts employed, although separately prepared, did not differ from one another in any way.

For the purpose of comparison, a number of catalyst charges were prepared under the same conditions as above, but using pure cyclohexane as diluent. Analysis showed that the quantity of titanium tetrachloride which had not reacted with the aluminium and which remained in solution in the cyclohexane was very variable and ranged from 30% to 75% of the initial quantity introduced. The catalysts obtained were all of grey colour, but those containing not more than 30% to 40% of unconverted $TiCl_4$ had pink tinges which distinguished them fairly clearly from the others.

A continuous polymerisation lasting 30 hours was carried out with the aid of these various charges under the same conditions as above.

It was observed that the activity of the catalysts varies in accordance with their colour and the content of residual titanium tetrachloride. Thus, catalysts still containing 75% of unchanged $TiCl_4$ had productivities of the order of 50 g. per g. $TiCl_4$ of a polymer having a specific viscosity of about 0.6, while catalysts containing only 30% to 40% of $TiCl_4$ had productivities of the order of 30 g. per g. of $TiCl_4$ of polymers having a specific viscosity of 0.7. The specific gravity of these polymers, measured at 25° C., is 0.965.

When moulded, these polymers give hard, brittle plates.

We claim:

1. Process for the production of a catalyst for the polymerisation of ethylene which comprises heating to an elevated temperature of at most 300° C. a mixture of titanium tetrachloride and aluminium in which the molecular ratio of aluminium to titanium tetrachloride is from 3:1 to 20:1 in the absence of ethylene and other hydrocarbons capable of polymerising under the conditions employed and in the presence of a liquid diluent comprising 90% to 99.5% by volume of cyclohexane and 10% to 0.5% by volume of benzene, the heating being continued until the catalyst has a pink to violet-pink colour.

2. Process for the production of solid polyethylene which comprises preparing a catalyst by heating to an elevated temperature of at most 300° C. a mixture of titanium tetrachloride and aluminium in which the molecular ratio of aluminium to titanium tetrachloride is from 3:1 to 20:1 in the absence of ethylene and other hydrocarbons capable of polymerising under the conditions employed and in the presence of a liquid diluent comprising 90% to 99.5% by volume of cyclohexane and 10% to 0.5% by volume of benzene, the heating being continued until the catalyst has a pink to violet-pink colour, and bringing ethylene into contact with the catalyst so formed under a pressure of 10–50 atmospheres at a temperature of 110–150° C. simultaneously with oxygen in amount approximately 50 cu. cm. for each cu. cm. of titanium tetrachloride employed.

References Cited in the file of this patent

UNITED STATES PATENTS 2,827,446     Breslow _____ Mar. 18, 1958

(Other references on following page)

UNITED STATES PATENTS

| | | | |
|---|---|---|---|
| 2,827,447 | Nowlin et al. | Mar. 18, 1958 |
| 2,846,427 | Findlay | Aug. 5, 1958 |
| 2,868,771 | Ray et al. | Jan. 13, 1959 |
| 2,910,461 | Nowlin et al. | Oct. 27, 1959 |

FOREIGN PATENTS

| | | |
|---|---|---|
| 538,782 | Belgium | Dec. 6, 1955 |
| 1,132,506 | France | Nov. 5, 1956 |
| 1,147,868 | France | June 11, 1957 |
| 1,149,945 | France | July 29, 1957 |